US011500094B2

(12) United States Patent
Oggier et al.

(10) Patent No.: US 11,500,094 B2
(45) Date of Patent: Nov. 15, 2022

(54) SELECTION OF PULSE REPETITION INTERVALS FOR SENSING TIME OF FLIGHT

(71) Applicant: Apple Inc., Cupertino, CA (US)

(72) Inventors: Thierry Oggier, San Jose, CA (US); Bernhard Buettgen, San Jose, CA (US); Cristiano L Niclass, San Jose, CA (US); Rahmi Hezar, San Jose, CA (US); Shingo Mandai, Mountain View, CA (US); Darshan Shrestha, Sunnyvale, CA (US); Gary Chung, Menlo Park, CA (US); Moshe Laifenfeld, Haifa (IL)

(73) Assignee: APPLE INC., Cupertino, CA (US)

( * ) Notice: Subject to any disclaimer, the term of this patent is extended or adjusted under 35 U.S.C. 154(b) by 282 days.

(21) Appl. No.: 16/885,316

(22) Filed: May 28, 2020

(65) Prior Publication Data

US 2020/0386890 A1 Dec. 10, 2020

Related U.S. Application Data

(60) Provisional application No. 62/859,211, filed on Jun. 10, 2019.

(51) Int. Cl.
*G01S 17/26* (2020.01)
*G01S 17/86* (2020.01)
(Continued)

(52) U.S. Cl.
CPC .............. *G01S 17/26* (2020.01); *G01S 7/524* (2013.01); *G01S 7/527* (2013.01); *G01S 7/53* (2013.01); *G01S 17/86* (2020.01)

(58) Field of Classification Search
CPC .......... G01S 17/26; G01S 7/524; G01S 7/527; G01S 7/53; G01S 17/86; G01S 7/4815;
(Continued)

(56) References Cited

U.S. PATENT DOCUMENTS

| 4,623,237 A | 11/1986 | Kaneda et al. |
| 4,757,200 A | 7/1988 | Shepherd |

(Continued)

FOREIGN PATENT DOCUMENTS

| CA | 2605339 C | * | 9/2008 | ........... A61B 5/0507 |
| CN | 103763485 A | | 4/2014 | |

(Continued)

OTHER PUBLICATIONS

JP Application # 2020001203 Office Action dated Feb. 4, 2021.
(Continued)

*Primary Examiner* — Daniel Pihulic
(74) *Attorney, Agent, or Firm* — Kligler & Associates Patent Attorneys Ltd

(57) ABSTRACT

Sensing apparatus includes a radiation source, which emits pulses of optical radiation toward multiple points in a target scene. A receiver receives the optical radiation that is reflected from the target scene and outputs signals that are indicative of respective times of flight of the pulses to and from the points in the target scene. Processing and control circuitry selects a first pulse repetition interval (PRI) and a second PRI, greater than the first PRI, from a permitted range of PRIs, drives the radiation source to emit a first sequence of the pulses at the first PRI and a second sequence of the pulses at a second PRI, and processes the signals output in response to both the first and second sequences of the pulses in order to compute respective depth coordinates of the points in the target scene.

18 Claims, 10 Drawing Sheets

(51) Int. Cl.
  *G01S 7/524* (2006.01)
  *G01S 7/527* (2006.01)
  *G01S 7/53* (2006.01)
(58) Field of Classification Search
  CPC ...... G01S 13/865; G01S 7/484; G01S 7/4865;
    G01S 7/4876; G01S 17/894; G01S 17/48;
    G01S 7/486; G01S 7/4863; G01S 17/003;
    G01S 17/88; H04M 1/72403; H04M
    2250/10; H04M 2250/52; B64D 45/00
  See application file for complete search history.

(56) References Cited

U.S. PATENT DOCUMENTS

| | | |
|---|---|---|
| 5,164,823 A | 11/1992 | Keeler |
| 5,270,780 A | 12/1993 | Moran et al. |
| 5,373,148 A | 12/1994 | Dvorkis et al. |
| 5,699,149 A | 12/1997 | Kuroda et al. |
| 6,301,003 B1 | 10/2001 | Shirai et al. |
| 6,384,903 B1 | 5/2002 | Fuller |
| 6,710,859 B2 | 3/2004 | Shirai et al. |
| 7,126,218 B1 | 10/2006 | Darveaux et al. |
| 7,193,690 B2 | 3/2007 | Ossig et al. |
| 7,303,005 B2 | 12/2007 | Reis et al. |
| 7,405,812 B1 | 7/2008 | Bamji |
| 7,508,496 B2 | 3/2009 | Mettenleiter et al. |
| 7,800,067 B1 | 9/2010 | Rajavel et al. |
| 7,800,739 B2 | 9/2010 | Rohner et al. |
| 7,812,301 B2 | 10/2010 | Oike et al. |
| 7,969,558 B2 | 6/2011 | Hall |
| 8,193,482 B2 | 6/2012 | Itsler |
| 8,259,293 B2 | 9/2012 | Andreou |
| 8,275,270 B2 | 9/2012 | Shushakov et al. |
| 8,355,117 B2 | 1/2013 | Niclass |
| 8,405,020 B2 | 3/2013 | Menge |
| 8,675,181 B2 | 3/2014 | Hall |
| 8,736,818 B2 | 5/2014 | Weimer et al. |
| 8,766,164 B2 | 7/2014 | Sanfilippo et al. |
| 8,766,808 B2 | 7/2014 | Hogasten |
| 8,891,068 B2 | 11/2014 | Eisele et al. |
| 8,925,814 B1 | 1/2015 | Schneider et al. |
| 8,963,069 B2 | 2/2015 | Drader et al. |
| 9,002,511 B1 | 4/2015 | Hickerson et al. |
| 9,024,246 B2 | 5/2015 | Jiang et al. |
| 9,052,356 B2 | 6/2015 | Chu et al. |
| 9,076,707 B2 | 7/2015 | Harmon |
| 9,016,849 B2 | 8/2015 | Duggal et al. |
| 9,335,220 B2 | 5/2016 | Shpunt et al. |
| 9,354,332 B2 | 5/2016 | Zwaans et al. |
| 9,465,111 B2 | 10/2016 | Wilks et al. |
| 9,516,248 B2 | 12/2016 | Cohen et al. |
| 9,709,678 B2 | 7/2017 | Matsuura |
| 9,736,459 B2 | 8/2017 | Mor et al. |
| 9,739,881 B1 | 8/2017 | Pavek et al. |
| 9,761,049 B2 | 9/2017 | Naegle et al. |
| 9,786,701 B2 | 10/2017 | Mellot et al. |
| 9,810,777 B2 | 11/2017 | Williams et al. |
| 9,874,635 B1 | 1/2018 | Eichenholz et al. |
| 10,063,844 B2 | 8/2018 | Adam et al. |
| 10,067,224 B2 | 9/2018 | Moore et al. |
| 10,132,616 B2 | 11/2018 | Wang |
| 10,215,857 B2 | 2/2019 | Oggier et al. |
| 10,269,104 B2 | 4/2019 | Hannuksela et al. |
| 10,386,487 B1 | 8/2019 | Wilton et al. |
| 10,424,683 B1 | 9/2019 | Do Valle et al. |
| 10,613,203 B1 | 4/2020 | Rekow et al. |
| 10,782,393 B2 | 9/2020 | Dussan et al. |
| 10,955,234 B2 * | 3/2021 | Roth .................. G01S 7/497 |
| 10,955,552 B2 * | 3/2021 | Fine .................. G01S 17/894 |
| 2001/0020673 A1 | 9/2001 | Zappa et al. |
| 2002/0071126 A1 | 6/2002 | Shirai et al. |
| 2002/0131035 A1 | 9/2002 | Watanabe et al. |
| 2002/0154054 A1 | 10/2002 | Small |
| 2002/0186362 A1 | 12/2002 | Shirai et al. |
| 2004/0051859 A1 | 3/2004 | Flockencier |
| 2004/0135992 A1 | 7/2004 | Munro |
| 2004/0212863 A1 | 10/2004 | Schanz et al. |
| 2006/0044546 A1 | 3/2006 | Lewin et al. |
| 2006/0106317 A1 | 5/2006 | McConnell et al. |
| 2007/0145136 A1 | 6/2007 | Wiklof et al. |
| 2009/0009747 A1 | 1/2009 | Wolf et al. |
| 2009/0262760 A1 | 10/2009 | Krupkin et al. |
| 2009/0273770 A1 | 11/2009 | Bauhahn et al. |
| 2009/0275841 A1 | 11/2009 | Melendez et al. |
| 2010/0019128 A1 | 1/2010 | Itzler |
| 2010/0045965 A1 | 2/2010 | Meneely |
| 2010/0096459 A1 | 4/2010 | Gurevich |
| 2010/0121577 A1 | 5/2010 | Zhang et al. |
| 2010/0250189 A1 | 9/2010 | Brown |
| 2010/0286516 A1 | 11/2010 | Fan et al. |
| 2011/0006190 A1 | 1/2011 | Alameh et al. |
| 2011/0128524 A1 | 6/2011 | Vert et al. |
| 2011/0181864 A1 | 7/2011 | Schmitt et al. |
| 2012/0038904 A1 | 2/2012 | Fossum et al. |
| 2012/0075615 A1 | 3/2012 | Niclass et al. |
| 2012/0132636 A1 | 5/2012 | Moore |
| 2012/0153120 A1 | 6/2012 | Baxter |
| 2012/0154542 A1 | 6/2012 | Katz et al. |
| 2012/0176476 A1 | 7/2012 | Schmidt et al. |
| 2012/0249998 A1 | 10/2012 | Eisele et al. |
| 2012/0287242 A1 | 11/2012 | Gilboa et al. |
| 2012/0294422 A1 | 11/2012 | Cheung et al. |
| 2013/0015331 A1 | 1/2013 | Birk et al. |
| 2013/0079639 A1 | 3/2013 | Hector et al. |
| 2013/0092846 A1 | 4/2013 | Henning et al. |
| 2013/0107016 A1 | 5/2013 | Federspiel |
| 2013/0208258 A1 | 8/2013 | Eisele et al. |
| 2013/0236171 A1 | 9/2013 | Saunders |
| 2013/0258099 A1 | 10/2013 | Ovsiannikov et al. |
| 2013/0278917 A1 | 10/2013 | Korekado et al. |
| 2013/0300838 A1 | 11/2013 | Borowski |
| 2013/0342835 A1 | 12/2013 | Blacksberg |
| 2014/0027606 A1 | 1/2014 | Raynor et al. |
| 2014/0077086 A1 | 3/2014 | Batkilin et al. |
| 2014/0078491 A1 | 3/2014 | Eisele et al. |
| 2014/0162714 A1 * | 6/2014 | Kim .................. H04W 72/02 455/509 |
| 2014/0191115 A1 | 7/2014 | Webster et al. |
| 2014/0198198 A1 | 7/2014 | Geissbuehler et al. |
| 2014/0231630 A1 | 8/2014 | Rae et al. |
| 2014/0240317 A1 | 8/2014 | Go et al. |
| 2014/0240691 A1 | 8/2014 | Mheen et al. |
| 2014/0268127 A1 | 9/2014 | Day |
| 2014/0300907 A1 | 10/2014 | Kimmel |
| 2014/0321862 A1 | 10/2014 | Frohlich et al. |
| 2014/0353471 A1 | 12/2014 | Raynor et al. |
| 2015/0041625 A1 | 2/2015 | Dutton et al. |
| 2015/0062558 A1 | 3/2015 | Koppal et al. |
| 2015/0131080 A1 | 5/2015 | Retterath et al. |
| 2015/0163429 A1 | 6/2015 | Dai et al. |
| 2015/0192676 A1 | 7/2015 | Kotelnikov et al. |
| 2015/0200222 A1 | 7/2015 | Webster |
| 2015/0200314 A1 | 7/2015 | Webster |
| 2015/0260830 A1 | 9/2015 | Ghosh et al. |
| 2015/0285625 A1 | 10/2015 | Deane et al. |
| 2015/0362585 A1 | 12/2015 | Ghosh et al. |
| 2015/0373322 A1 | 12/2015 | Goma et al. |
| 2016/0003944 A1 | 1/2016 | Schmidtke et al. |
| 2016/0041266 A1 | 2/2016 | Smits |
| 2016/0072258 A1 | 3/2016 | Seurin et al. |
| 2016/0080709 A1 | 3/2016 | Viswanathan et al. |
| 2016/0259038 A1 | 9/2016 | Retterath et al. |
| 2016/0259057 A1 | 9/2016 | Ito |
| 2016/0274222 A1 | 9/2016 | Yeun |
| 2016/0334508 A1 | 11/2016 | Hall et al. |
| 2016/0344965 A1 | 11/2016 | Grauer |
| 2017/0006278 A1 | 1/2017 | Vandame et al. |
| 2017/0038459 A1 | 2/2017 | Kubacki et al. |
| 2017/0052065 A1 | 2/2017 | Sharma et al. |
| 2017/0067734 A1 | 3/2017 | Heidemann et al. |
| 2017/0131388 A1 | 5/2017 | Campbell et al. |
| 2017/0131718 A1 | 5/2017 | Matsumura et al. |
| 2017/0139041 A1 | 5/2017 | Drader et al. |
| 2017/0176577 A1 | 6/2017 | Halliday |

(56) References Cited

U.S. PATENT DOCUMENTS

| | | | |
|---|---|---|---|
| 2017/0176579 A1 | 6/2017 | Niclass et al. | |
| 2017/0179173 A1 | 6/2017 | Mandai et al. | |
| 2017/0184450 A1 | 6/2017 | Doylend et al. | |
| 2017/0184704 A1 | 6/2017 | Yang et al. | |
| 2017/0184709 A1 | 6/2017 | Kenzler et al. | |
| 2017/0188016 A1 | 6/2017 | Hudman | |
| 2017/0219695 A1 | 8/2017 | Hall et al. | |
| 2017/0242102 A1 | 8/2017 | Dussan et al. | |
| 2017/0242108 A1 | 8/2017 | Dussan et al. | |
| 2017/0257617 A1 | 9/2017 | Retterath | |
| 2017/0269209 A1 | 9/2017 | Hall et al. | |
| 2017/0303789 A1 | 10/2017 | Tichauer et al. | |
| 2017/0329010 A1 | 11/2017 | Warke et al. | |
| 2017/0343675 A1 | 11/2017 | Oggier et al. | |
| 2017/0356796 A1 | 12/2017 | Nishio | |
| 2017/0356981 A1 | 12/2017 | Yang et al. | |
| 2018/0045816 A1 | 2/2018 | Jarosinski et al. | |
| 2018/0059220 A1 | 3/2018 | Irish et al. | |
| 2018/0062345 A1 | 3/2018 | Bills et al. | |
| 2018/0081032 A1 | 3/2018 | Torruellas et al. | |
| 2018/0081041 A1 | 3/2018 | Niclass et al. | |
| 2018/0115762 A1 | 4/2018 | Bulteel et al. | |
| 2018/0131449 A1 | 5/2018 | Kare et al. | |
| 2018/0167602 A1 | 6/2018 | Pacala et al. | |
| 2018/0203247 A1 | 7/2018 | Chen et al. | |
| 2018/0205943 A1 | 7/2018 | Trail | |
| 2018/0209846 A1* | 7/2018 | Mandai | G01S 7/4863 |
| 2018/0259645 A1 | 9/2018 | Shu et al. | |
| 2018/0299554 A1 | 10/2018 | Van Dyck et al. | |
| 2018/0341009 A1 | 11/2018 | Niclass et al. | |
| 2019/0004156 A1 | 1/2019 | Niclass et al. | |
| 2019/0011556 A1 | 1/2019 | Pacala et al. | |
| 2019/0011567 A1 | 1/2019 | Pacala et al. | |
| 2019/0018117 A1 | 1/2019 | Perenzoni et al. | |
| 2019/0018118 A1 | 1/2019 | Perenzoni et al. | |
| 2019/0018119 A1* | 1/2019 | Laifenfeld | G01S 7/4865 |
| 2019/0018143 A1 | 1/2019 | Thayer et al. | |
| 2019/0037120 A1 | 1/2019 | Ohki | |
| 2019/0056497 A1 | 2/2019 | Pacala et al. | |
| 2019/0094364 A1 | 3/2019 | Fine et al. | |
| 2019/0170855 A1 | 6/2019 | Keller et al. | |
| 2019/0178995 A1 | 6/2019 | Tsai et al. | |
| 2019/0257950 A1 | 8/2019 | Patanwala et al. | |
| 2019/0277952 A1 | 9/2019 | Beuschel et al. | |
| 2019/0361404 A1 | 11/2019 | Mautner et al. | |
| 2020/0142033 A1 | 5/2020 | Shand | |
| 2020/0233068 A1 | 7/2020 | Henderson et al. | |
| 2020/0256669 A1 | 8/2020 | Roth et al. | |
| 2020/0256993 A1 | 8/2020 | Oggier | |
| 2020/0314294 A1 | 10/2020 | Schoenlieb et al. | |
| 2020/0386890 A1* | 12/2020 | Oggier | G01S 7/4815 |

FOREIGN PATENT DOCUMENTS

| | | | | |
|---|---|---|---|---|
| CN | 104730535 A | | 6/2015 | |
| CN | 104914446 A | | 9/2015 | |
| CN | 105992960 A | | 10/2016 | |
| CN | 106405572 A | | 2/2017 | |
| CN | 110609293 A | | 12/2019 | |
| CN | 110869804 A | * | 3/2020 | G01S 17/10 |
| CN | 112068149 A | * | 12/2020 | B64D 45/00 |
| DE | 202013101039 U1 | | 3/2014 | |
| EP | 2157445 A2 | | 2/2010 | |
| EP | 2322953 A1 | | 5/2011 | |
| EP | 2469297 A1 | | 6/2012 | |
| EP | 2477043 A1 | | 7/2012 | |
| EP | 2827175 A2 | | 1/2015 | |
| EP | 3285087 A1 | * | 2/2018 | B64D 45/00 |
| EP | 3285087 A1 | | 2/2018 | |
| EP | 3318895 A1 | | 5/2018 | |
| EP | 3521856 A1 | | 8/2019 | |
| EP | 3751307 A1 | * | 12/2020 | B64D 45/00 |
| JP | H02287113 A | | 11/1990 | |
| JP | H0567195 A | | 3/1993 | |
| JP | 09197045 A | | 7/1997 | |
| JP | H10170637 A | | 6/1998 | |
| JP | H11063920 A | | 3/1999 | |
| JP | 2011089874 A | | 5/2011 | |
| JP | 2011237215 A | | 11/2011 | |
| JP | 2013113669 A | | 6/2013 | |
| JP | 2014059301 A | | 4/2014 | |
| KR | 101318951 B1 | | 10/2013 | |
| WO | 9008946 A1 | | 8/1990 | |
| WO | 2010149593 A1 | | 12/2010 | |
| WO | 2013028691 A1 | | 2/2013 | |
| WO | 2015199615 A1 | | 12/2015 | |
| WO | 2017106875 A1 | | 6/2017 | |
| WO | 2018122560 A1 | | 7/2018 | |
| WO | 2020101576 A1 | | 5/2020 | |
| WO | 2020109378 A1 | | 6/2020 | |
| WO | 2020201452 A1 | | 10/2020 | |

OTHER PUBLICATIONS

U.S. Appl. No. 16/752,653 Office Action dated Feb. 4, 2021.

Morbi et al., "Short range spectral lidar using mid-infrared semiconductor laser with code-division multiplexing technique", Technical Digest, CLEO 2001, pp. 491-492 pages, May 2001.

Al et al., "High-resolution random-modulation cw lidar", Applied Optics, vol. 50, issue 22, pp. 4478-4488, Jul. 28, 2011.

Chung et al., "Optical orthogonal codes: design, analysis and applications", IEEE Transactions on Information Theory, vol. 35, issue 3, pp. 595-604, May 1989.

Lin et al., "Chaotic lidar", IEEE Journal of Selected Topics in Quantum Electronics, vol. 10, issue 5, pp. 991-997, Sep.-Oct. 2004.

U.S. Appl. No. 15/844,665 office action dated Jun. 1, 2020.

U.S. Appl. No. 15/950,186 office action dated Jun. 23, 2020.

Charbon et al., "SPAD-Based Sensors", TOF Range-Imaging Cameras, Springer-Verlag, pp. 11-38, year 2013.

Niclass et al., "A 0.18 um CMOS SoC for a 100m range, 10 fps 200×96 pixel Time of Flight depth sensor", IEEE International Solid- State Circuits Conference—(ISSCC), Session 27, Image Sensors, 27.6, pp. 488-490, Feb. 20, 2013.

Walker et al., "A 128×96 pixel event-driven phase-domain ΔΣ-based fully digital 3D camera in 0.13μm CMOS imaging technology", IEEE International Solid- State Circuits Conference—(ISSCC), Session 23, Image Sensors, 23.6, pp. 410-412, Feb. 23, 2011.

Niclass et al., "Design and characterization of a 256×64-pixel single-photon imager in CMOS for a MEMS-based laser scanning time-of-flight sensor", Optics Express, vol. 20, issue 11, pp. 11863-11881, May 21, 2012.

Kota et al., "System Design and Performance Characterization of a MEMS-Based Laser Scanning Time-of-Flight Sensor Based on a 256 × 64-pixel Single-Photon Imager", IEEE Photonics Journal, vol. 5, issue 2, pp. 1-15, Apr. 2013.

Webster et al., "A silicon photomultiplier with >30% detection efficiency from 450-750nm and 116μm pitch NMOS-only pixel with 21.6% fill factor in 130nm CMOS", Proceedings of the European Solid-State Device Research Conference (ESSDERC), pp. 238-241, Sep. 7-21, 2012.

Bradski et al., "Learning OpenCV", first edition, pp. 1-50, O'Reilly Media, Inc, California, USA, year 2008.

Buttgen et al., "Pseudonoise Optical Modulation for Real-Time 3-D Imaging With Minimum Interference", IEEE Transactions on Circuits and Systems I: Regular Papers, vol. 54, Issue10, pp. 2109-2119, Oct. 1, 2007.

International Application # PCT/US2020/058760 Search Report dated Feb. 9, 2021.

FW Application # 109119267 Office Action dated Mar. 10, 2021.

U.S. Appl. No. 16/752,653 Office Action dated Apr. 5, 2021.

EP Application No. 20177707.5 Search Report dated Sep. 29, 2020.

U.S. Appl. No. 16/532,517 Office Action dated Oct. 14, 2020.

EP Application # 20177707.5 Search Report dated Nov. 12, 2020.

IN Application # 202117029897 Office Action dated Mar. 10, 2022.

IN Application # 202117028974 Office Action dated Mar. 2, 2022.

U.S. Appl. No. 16/752,653 Office Action dated Oct. 1, 2021.

EP Application # 17737420.4 Office Action dated Oct. 28, 2021.

KR Application # 1020200068248 Office Action dated Nov. 12, 2021.

(56) References Cited

OTHER PUBLICATIONS

KR Application # 1020207015906 Office Action dated Oct. 13, 2021.
CN Application # 201680074428.8 Office Action dated Jun. 23, 2021.
Zhu Jian, "Research of Simulation of Super-Resolution Reconstruction of Infrared Image", abstract page, Master's Thesis, p. 1, Nov. 15, 2005.
U.S. Appl. No. 16/679,360 Office Action dated Jun. 29, 2022.
EP Application #22167103.5 Search Report dated Jul. 11, 2022.
CN Application #201780058088.4 Office Action dated Aug. 23, 2022.
U.S. Appl. No. 16/532,513 Office Action dated Aug. 4, 2022.
CN Application #201810571820.4 Office Action dated Sep. 9, 2022.

* cited by examiner

SELECTION OF PULSE REPETITION INTERVALS FOR SENSING TIME OF FLIGHT

CROSS-REFERENCE TO RELATED APPLICATION

This application claims the benefit of U.S. Provisional Patent Application 62/859,211, filed Jun. 10, 2019, which is incorporated herein by reference.

FIELD OF THE INVENTION

The present invention relates generally to systems and methods for depth mapping, and particularly to beam sources used in time-of-flight (ToF) sensing.

BACKGROUND

Existing and emerging consumer applications have created an increasing need for real-time three-dimensional (3D) imagers. These imaging devices, also known as depth sensors or depth mappers, enable the remote measurement of distance (and often intensity) to each point in a target scene—referred to as target scene depth—by illuminating the target scene with an optical beam and analyzing the reflected optical signal. A commonly-used technique to determine the distance to each point on the target scene involves transmitting one or more pulsed optical beams towards the target scene, followed by the measurement of the round-trip time, i.e. time-of-flight (ToF), taken by the optical beams as they travel from the source to the target scene and back to a detector array adjacent to the source.

Some ToF systems use single-photon avalanche diodes (SPADs), also known as Geiger-mode avalanche photodiodes (GAPDs), in measuring photon arrival time.

SUMMARY

Embodiments of the present invention that are described hereinbelow provide improved depth mapping systems and methods for operating such systems.

There is therefore provided, in accordance with an embodiment of the invention, sensing apparatus, including a radiation source, which is configured to emit pulses of optical radiation toward multiple points in a target scene. A receiver is configured to receive the optical radiation that is reflected from the target scene and to output signals, responsively to the received optical radiation, that are indicative of respective times of flight of the pulses to and from the points in the target scene. Processing and control circuitry is configured to select a first pulse repetition interval (PRI) and a second PRI, greater than the first PRI, from a permitted range of PRIs, and to drive the radiation source to emit a first sequence of the pulses at the first PRI and a second sequence of the pulses at a second PRI, and to process the signals output by the receiver in response to both the first and second sequences of the pulses in order to compute respective depth coordinates of the points in the target scene.

In a disclosed embodiment, the radiation source includes an array of vertical-cavity surface-emitting lasers (VCSELs). Additionally or alternatively, the radiation source includes an array of emitters, which are arranged in multiple banks, and the processing and control circuitry is configured to drive the multiple banks sequentially so that each bank emits respective first and second sequences of the pulses at the first and second PRIs. Further additionally or alternatively, the sensing elements include single-photon avalanche diodes (SPADs).

In some embodiments, the first PRI defines a range limit, at which a time of flight of the pulses is equal to the first PRI, and the processing and control circuitry is configured to compare the signals output by the receiver in response to the first and second sequences of pulses in order to distinguish the points in the scene for which the respective depth coordinates are less than the range limit from the points in the scene for which the respective depth coordinates are greater than the range limit, thereby resolving range folding of the depth coordinates. In one such embodiment, the processing and control circuitry is configured to compute, for each of the points in the scene, respective first and second histograms of the times of flight of the pulses in the first and second sequences, and to detect that range folding has occurred at a given point responsively to a difference between the first and second histograms.

In some embodiments, the apparatus includes one or more radio transceivers, which communicate over the air by receiving signals in at least one assigned frequency band, wherein the processing and control circuitry is configured to identify the permitted range of the PRIs responsively to the assigned frequency band. Typically, the permitted range is defined so that the PRIs in the permitted range have no harmonics within the assigned frequency band. Additionally or alternatively, the processing and control circuitry is configured to modify the permitted range in response to a change in the assigned frequency band of the radio transceiver, and select new values of one or both of the first PRI and the second PRI so that the new values fall within the modified range.

In a disclosed embodiment, the processing and control circuitry is configured to store a record of multiple groups of the PRIs, to identify an operating environment of the apparatus, and to select one of the groups to apply in driving the radiation source responsively to the identified operating environment. The processing and control circuitry can be configured to select the one of the groups responsively to a geographical region in which the apparatus is operating. Additionally or alternatively, the groups of the PRIs have respective priorities that are assigned responsively to a likelihood of interference with frequencies used by the radio transceiver, and the processing and control circuitry is configured to select the one of the groups responsively to the respective priorities. In one embodiment, the PRIs in each group are co-prime with respect to the other PRIs in the group.

In another embodiment, the processing and control circuitry is configured to select a third PRI, greater than the second PRI, from the permitted range of the PRIs, and to drive the radiation source to emit a third sequence of the pulses at the third PRI, and to process the signals output by the receiver in response to the first, second and third sequences of the pulses in order to compute the respective depth coordinates of the points in the target scene.

Additionally or alternatively, the processing and control circuitry is configured to select the first and second PRIs so as to maximize a range of the depth coordinates while maintaining a resolution of the depth coordinates to be no greater than a predefined resolution limit.

There is also provided, in accordance with an embodiment of the invention, a method for sensing, which includes selecting a first pulse repetition interval (PRI) and a second PRI, greater than the first PRI, from a permitted range of PRIs. A radiation source is driven to emit a first sequence of pulses of optical radiation at the first PRI and a second sequence of the pulses of the optical radiation at the second PRI toward each of multiple points in a target scene. The optical radiation that is reflected from the target scene is received, and signals are output, responsively to the received optical radiation, that are indicative of respective times of flight of the pulses to and from the points in the target scene. The signals are processed in response to both the first and second sequences of the pulses in order to compute respective depth coordinates of the points in the target scene.

The present invention will be more fully understood from the following detailed description of the embodiments thereof, taken together with the drawings in which:

DETAILED DESCRIPTION OF EMBODIMENTS

Overview

Figure 1:
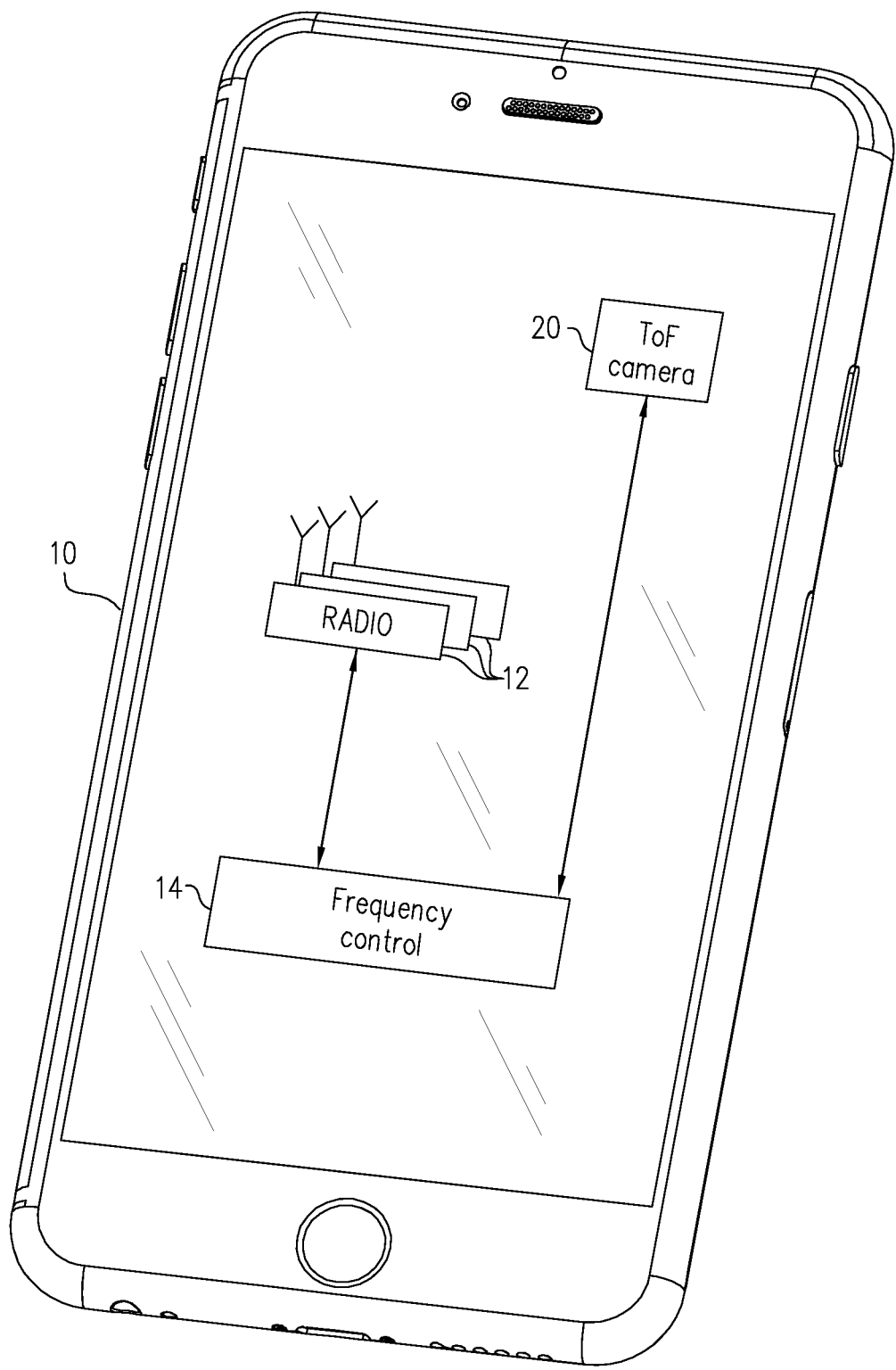
FIG. 1 is a block diagram that schematically illustrates a mobile communication device with a depth mapping camera, in accordance with an embodiment of the invention.

Embodiments of the present invention provide ToF-based depth sensing apparatus, in which a radiation source emits pulses of optical radiation toward multiple points in a target scene. (The term "optical radiation" is used interchangeably with the term "light" in the context of the present description and the claims, to mean electromagnetic radiation in any of the visible, infrared and ultraviolet spectral ranges.) A receiver receives the optical radiation reflected from the target scene and outputs signals that are indicative of the respective times of flight of the pulses to and from the points in the target scene. Processing and control circuitry drives the radiation source and processes the signals output by the receiver in order to compute respective depth coordinates of the points in the target scene.

Apparatus of this sort often suffers from problems of low signal/noise ratio (SNR). To increase the SNR, the processing and control circuitry collects and analyzes signals from the receiver over sequences of many pulses that are emitted by the radiation source. In some cases, the processing and control circuitry computes histograms of the times of flight of the sequences of pulses that are reflected from each point in the target scene, and uses analysis of the histogram (e.g., the mode of the histogram at each point) as an indicator of the corresponding depth coordinate. To generate and output the depth coordinates at a reasonable frame rate (for example, 30 frames/sec), while collecting signals over sequences of many pulses, it is desirable that the radiation source emit the sequences of pulses at a high pulse repetition frequency (PRF), or equivalently, with a low pulse repetition interval (PRI). For example, the radiation source may output pulses of about 1 ns duration, with a PRI of 40-50 ns.

The use of a short PRI, however, gives rise to problems of range folding: Because optical radiation propagates at approximately 30 cm/ns, when a pulse emitted in a sequence with PRI of 40 ns reflects from an object that is more than about 6 m away from the apparatus, the reflected radiation will reach the receiver only after the next pulse has already been emitted by the radiation source. The processing and control circuitry will then be unable to determine whether the received radiation originated from the most recent emitted pulse, due to reflection from a nearby object, or from a pulse emitted earlier in the sequence, due to a distant object. The PRI thus effectively defines a range limit, which is proportional to the PRI and sets an upper bound on the distance of objects that can be sensed by the apparatus.

Embodiments of the present invention address this problem by using two or more different PRIs in succession. The processing and control circuitry selects (at least) first and second PRIs from a permitted range of PRIs. It then drives the radiation source to emit a first sequence of the pulses at the first PRI and a second sequence of the pulses at a second PRI, and processes the signals output by the receiver in response to both the first and second sequences of pulses in order to compute depth coordinates of the points in the target scene. The sequences may be transmitted one after the other, or they may be interleaved, with pulses transmitted in alternation at the first PRI and the second PRI. Although the embodiments described below mainly refer, for the sake of simplicity, to only first and second PRIs, the principles of these embodiments may be readily extended to three or more different PRIs.

More specifically, in order to resolve and disambiguate possible range folding, the processing and control circuitry compares the signals output by the receiver in response to the first sequence of pulses to those output in response to the second sequence, in order to distinguish the points in the scene for which the respective depth coordinates are less than the range limit defined by the PRI from the points in the scene for which the respective depth coordinates are greater than the range limit. For example, the processing and control circuitry may compute, for each of the points in the scene, respective first and second histograms of the times of flight of the pulses in the first and second sequences. For objects closer than the range limit, the two histograms will be roughly identical. Objects beyond the range limit, however, will give rise to different histograms in response to the different PRIs of the first and second pulse sequences. The processing and control circuitry is thus able to detect that range folding has occurred at each point in the target scene based on the similarity or difference between the first and second histograms at each point.

Another problem arises when the depth sensing apparatus is incorporated in a mobile communication device, such as a smartphone: The mobile communication device comprises at least one radio transceiver (and often multiple radio transceivers), which communicates over the air by receiving signals in an assigned frequency band, for example one of the bands defined by the ubiquitous LTE standards for cellular communications. Furthermore, the assigned frequency band will often change as the device roams from one cell to another. Meanwhile, the sequences of short, intense current pulses that are used to drive the radiation source at high PRF give rise to harmonics, some of which may fall within the assigned frequency band of the transceiver. The noise due to these harmonics can severely degrade the SNR of the radio transceiver.

To overcome this problem, in some embodiments of the present invention, the processing and control circuitry identifies a permitted range of the PRIs in a manner that avoids interference with the assigned frequency band of the radio transceiver, and selects the first and second PRI values to be within this permitted range. The permitted range is preferably defined, in other words, so that the PRIs in the permitted range will have no harmonics within the assigned frequency band. The permitted range may be defined, for example, as a list of permitted PRI values, or as a set of intervals within the PRI values may be chosen. Additionally or alternatively, multiple groups of two or more PRIs may be defined in advance and stored in a record held by the apparatus. The appropriate group can then be identified and used depending on the radio operating environment of the apparatus.

When the assigned frequency band of the radio transceiver changes, the processing and control circuitry will modify the permitted range or group of PRI values accordingly. When necessary, the processing and control circuitry will select new values of one or all of the PRIs so that the new values fall within the modified range. The PRIs may be selected, subject to these range constraints, by applying predefined optimization criteria, for example to maximize the range of the depth coordinates while maintaining the resolution of the depth coordinates at a value no greater than a predefined resolution limit.

As noted earlier, although some of the embodiments described herein relate, for the sake of simplicity, to scenarios using two PRI values, the principles of the present invention may similarly be applied to selection and use of three or more PRI values. The use of a larger number of PRI values, within different parts of the permitted range, can be useful in enhancing the range and resolution of depth mapping.

System Description

FIG. 1 is a block diagram that schematically illustrates a mobile communication device 10, which includes a ToF-based depth camera 20, in accordance with an embodiment of the invention. Device 10 is shown in FIG. 1 as a smartphone, but the principles of the present invention may similarly be applied in any sort of device that carries out both radio communications (typically, although not exclusively, over cellular networks) and optical sensing at high pulse repetition rates.

Device 10 comprises multiple radio transceivers 12, which transmit radio signals to and/or receive radio signals from respective networks. For LTE cellular networks, for example, the radio signals can be in any of a number of different frequency bands, typically in the range between 800 MHz and 3000 MHz, depending on territory and type of service. As device 10 roams, the frequency bands on which it transmits and receives signals will typically change. A frequency controller 14 in device 10 selects the frequencies to be used in radio communication by transceivers 12 at any given time.

Camera 20 senses depth by outputting trains of optical pulses toward a target scene and measuring the times of flight of the pulses that are reflected back from the scene to the camera. Details of the structure and operation of camera 20 are described with reference to the figures that follow.

Generation of the optical pulses emitted from camera 20 gives rise to substantial electrical noise within device 10 both at the pulse repetition frequency of camera 20 (PRF, which is the inverse of the pulse repetition interval, or PRI) and at harmonics of the PRF. To avoid interfering with the operation of transceivers 12, frequency controller 14 provides camera 20 with a current range of permitted PRIs, whose harmonics fall entirely outside the frequency band or bands on which transceivers 12 are currently transmitting and receiving. (Alternatively, the frequency controller may notify the camera of the frequency band or bands on which the transceiver is currently transmitting and receiving, and the camera may itself derive the current range of permitted PRIs on this basis.) The range may have the form, for example, of a list of permitted PRIs (or equivalently, PRFs) or a set of intervals within which the PRI (or PRF) may be chosen. Camera 20 selects a pair of PRIs from the permitted range that will give optimal depth mapping performance, or possibly three or more PRIs, while thus avoiding interference with communications by device 10. Details of the criteria and process for selection are explained below.

Figure 2:
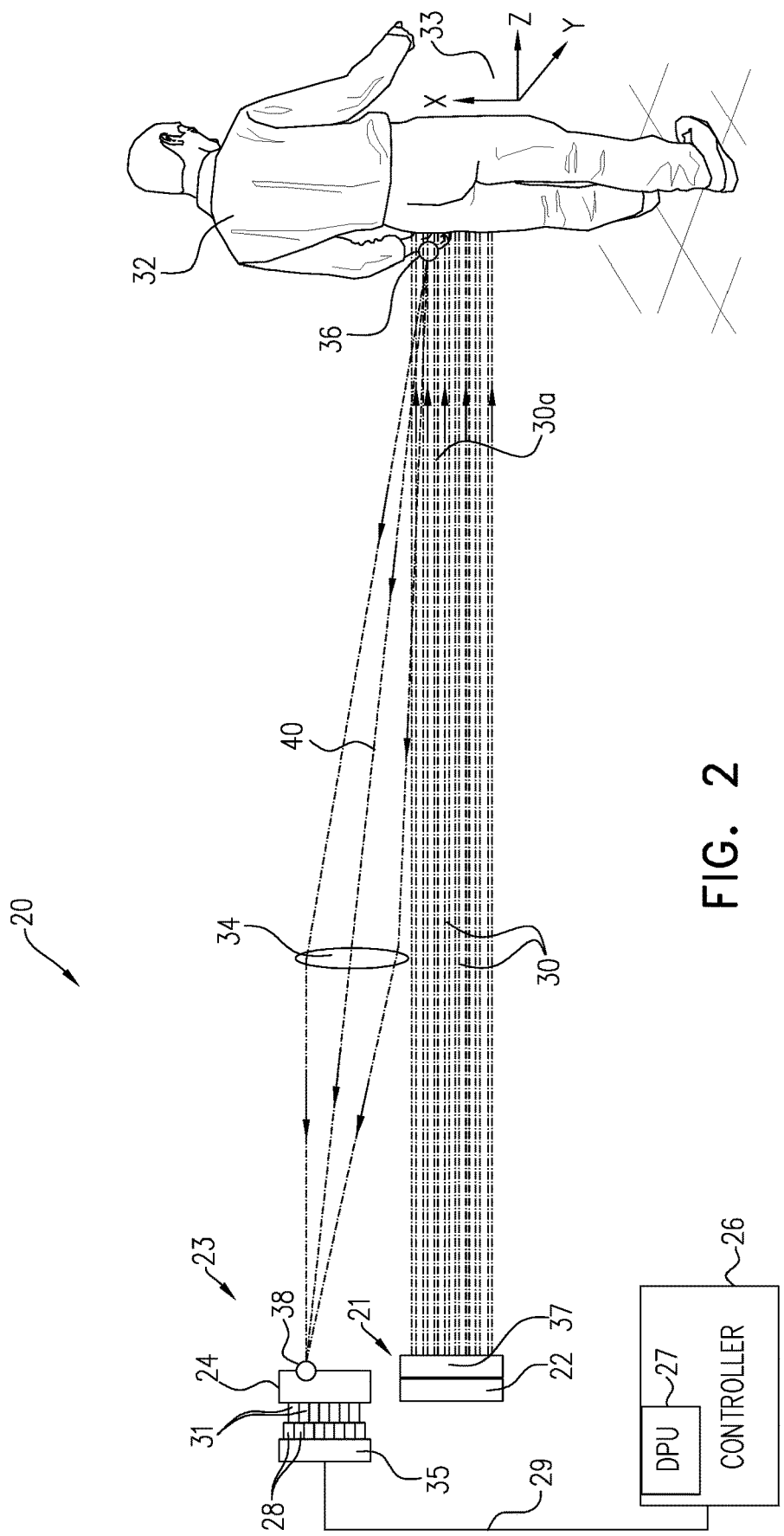
FIG. 2 is a schematic side view of a depth mapping camera, in accordance with an embodiment of the invention.

FIG. 2 is a schematic side view of depth camera 20, in accordance with an embodiment of the invention. Camera 20 comprises a radiation source 21, which emits M individual pulsed beams (for example, M may be on the order of 500). The radiation source comprises emitters arranged in a two-dimensional array 22, which may be grouped into multiple banks (as shown in detail in FIG. 3), together with beam optics 37. The emitters typically comprise solid-state devices, such as vertical-cavity surface-emission lasers (VCSELs) or other sorts of lasers or light-emitting diodes (LEDs). The emitters are driven by a controller 26 to emit optical pulses at two different PRIs, as described further hereinbelow.

Beam optics 37 typically comprise a collimating lens and may comprise a diffractive optical element (DOE), which replicates the actual beams emitted by array 22 to create the M beams that are projected onto the scene 32. (For example, an array of four banks with 16 VCSELs in a 4×4 arrangement in each bank may be used to create 8×8 beams, and a DOE may split each beam into 3×3 replicas to give a total of 24×24 beams.) For the sake of simplicity, these internal elements of beam optics 37 are not shown.

A receiver 23 in camera 20 comprises a two-dimensional detector array, such as SPAD array 24, together with J processing units 28 and select lines 31 for coupling the processing units to the SPADs. A combining unit 35 passes the digital outputs of processing units 28 to controller 26. SPAD array 24 comprises a number of detector elements N, which may be equal to M or possibly much larger than M, for example, 100×100 pixels or 200×200 pixels. The number J of processing units 28 depends on the number of pixels of SPAD array 24 to which each processing unit is coupled.

Array 22 emits M pulsed beams 30 of light, which are directed by beam optics 37 toward a target scene 32. Although beams 30 are depicted in FIG. 2 as parallel beams of constant width, each beam diverges as dictated by diffraction. Furthermore, beams 30 diverge from each other so as to cover a required area of scene 32. Scene 32 reflects or otherwise scatters those beams 30 that impinge on the scene. The reflected and scattered beams are collected by objective optics 34, represented by a lens in FIG. 2, which form an image of scene 32 on array 24. Thus, for example, a small region 36 on scene 32, on which a beam 30a has impinged, is imaged onto a small area 38 on SPAD array 24.

A Cartesian coordinate system 33 defines the orientation of depth camera 20 and scene 32. The x-axis and the y-axis are oriented in the plane of SPAD array 24. The z-axis is perpendicular to the array and points to scene 32 that is imaged onto SPAD array 24.

For clarity, processing units 28 are shown as if separate from SPAD array 24, but they are commonly integrated with the SPAD array. Similarly, combining unit 35 is commonly integrated with SPAD array 24. Processing units 28, together with combining unit 35, comprise hardware amplification and logic circuits, which sense and record pulses output by the SPADs in respective pixels or groups of pixels (referred to as "super-pixels"). These circuits thus measure the times of arrival of the photons that gave rise to the pulses, as well as the strengths of the optical pulses impinging on SPAD array 24.

Processing units 28 together with combining unit 35 may assemble one or more histograms of the times of arrival of multiple pulses emitted by array 22, and thus output signals that are indicative of the distance to respective points in scene 32, as well as of signal strength. Circuitry that can be used for this purpose is described, for example, in U.S. Patent Application Publication 2017/0176579, whose disclosure is incorporated herein by reference. Alternatively or additionally, some or all of the components of processing units 28 and combining unit 35 may be separate from SPAD array 24 and may, for example, be integrated with controller 26. For the sake of generality, controller 26, processing units 28 and combining unit 35 are collectively referred to herein as "processing and control circuitry."

Controller 26 is coupled to both radiation source 21 and receiver 23. Controller 26 drives the banks of emitters in array 22 in alternation, at the appropriate PRIs, to emit the pulsed beams. The controller also provides to the processing and combining units in receiver 23 an external control signal 29, and receives output signals from the processing and combining units. The output signals may comprise histogram data, and may be used by controller 26 to derive both times of incidence and signal strengths. Controller 26 calculates from the timing of the emission of beams 30 by VCSEL array 22 and from the times of arrival measured by the M processing units 28 the time-of-flight of the M beams, and thus maps the distance to the corresponding M points in scene 32.

In some embodiments, in order to make optimal use of the available sensing and processing resources, controller 26 identifies the respective areas of SPAD array 24 on which the pulses of optical radiation reflected from corresponding regions of target scene 32 are imaged by lens 34, and chooses the super-pixels to correspond to these areas. The signals output by sensing elements outside these areas are not used, and these sensing elements may thus be deactivated, for example by reducing or turning off the bias voltage to these sensing elements.

For clarity, the dimensions of emitter array 22 and SPAD array 24 have been exaggerated in FIG. 2 relative to scene 32. The lateral separation of emitter array 22 and SPAD array 24, referred to as the "baseline," is in reality much smaller than the distance from emitter array 22 to scene 32. Consequently a chief ray 40 (a ray passing through the center of objective optics 34) from scene 32 to SPAD array 24 is nearly parallel to rays 30, leading to only a small amount of parallax.

Controller 26 typically comprises a programmable processor, which is programmed in software and/or firmware to carry out the functions that are described herein. Alternatively or additionally, controller 26 comprises hard-wired and/or programmable hardware logic circuits, which carry out at least some of the functions of the controller. Although controller 26 is shown in the figure, for the sake of simplicity, as a single, monolithic functional block, in practice the controller may comprise a single chip or a set of two or more chips, with suitable interfaces for receiving and outputting the signals that are illustrated in the figure and are described in the text.

One of the functional units of controller 26 is a depth processing unit (DPU) 27, which receives and processes signals from both processing units 28. DPU 27 calculates the times of flight of the photons in each of beams 30, and thus maps the distance to the corresponding points in target scene 32. This mapping is based on the timing of the emission of beams 30 by emitter array 22 and from the times of arrival (i.e., times of incidence of reflected photons) measured by processing units 28. DPU 27 makes use of the histograms accumulated at the two different PRIs of emitter array 22 in disambiguating any "range folding" that may occur, as explained below with reference to FIG. 4. Controller 26 typically stores the depth coordinates in a memory, and may output the corresponding depth map for display and/or further processing.

Figure 3:
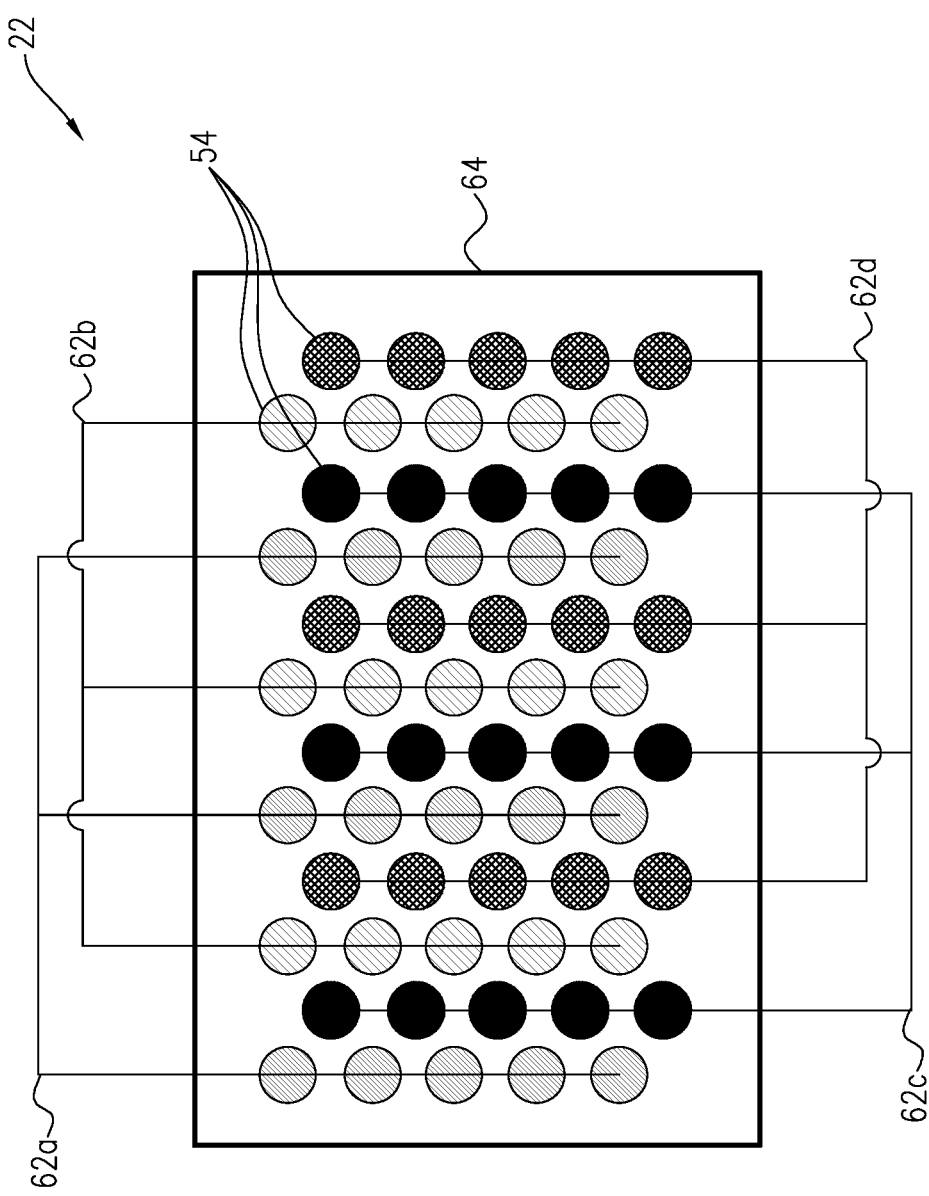
FIG. 3 is a schematic frontal view of an array of emitters that can be used in a depth mapping camera, in accordance with an embodiment of the invention.

FIG. 3 is a schematic frontal view of emitter array 22 in beam source 21, in accordance with an embodiment of the invention. Four banks 62a, 62b, 62c and 62d of vertical emitters 54 are interleaved as alternating vertical stripes on a substrate 64, such as a semiconductor chip. Each bank comprises a number of stripes that alternate on the substrate with the stripes in the other banks. Alternatively, other interleaving schemes may be used. Emitters 54 emit respective beams 30 toward optics 37, which collimate and project the beams toward the target scene. In a typical implementation, emitters 54 comprise VCSELs, which are driven by electrical pulses that are about 1 ns wide, with sharp rising and falling edges and with peak pulse currents in excess of 1 A, and with a PRI on the order of 40 ns. Alternatively, other timing and current parameters may be used, depending upon application requirements.

To enable selection and switching among the different banks, array 22 may be mounted on a driver chip (not shown), for example, a silicon chip with CMOS circuits for selecting and driving the individual VCSELs or banks of VCSELs. The banks of VCSELS in this case may be physically separated, for ease of fabrication and control, or they may be interleaved on the VCSEL chip, with suitable connections to the driver chip to enable actuating the banks in alternation. Thus, beams 30 likewise irradiate the target scene in a time-multiplexed pattern, with different sets of the beams impinging on the respective regions of the scene at different times.

As further alternatives to the pictured embodiments, array 22 may comprise a larger or smaller number of banks and emitters. Typically, for sufficient coverage of the target scenes with static (non-scanned) beams, array 22 comprises at least four banks 62, with at least four emitters 54 in each bank, and possibly with a DOE for splitting the radiation emitted by each of the emitters. For denser coverage, array 22 comprises at least eight banks, with twenty emitters or more in each bank. These options enhance the flexibility of camera 20 in terms of time-multiplexing of the optical and electrical power budgets, as well as processing resources.

PRI Selection and Control

Figure 4A:
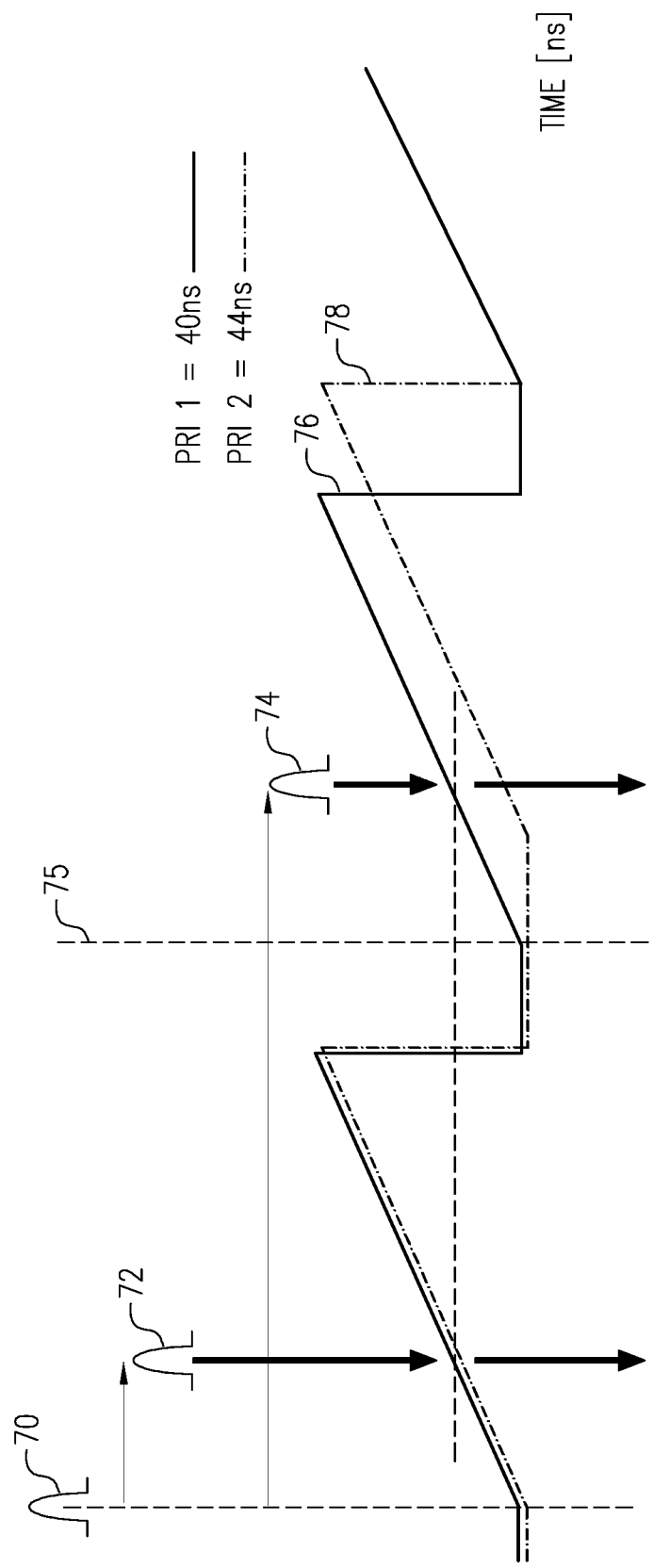
FIGS. 4A, 4B, 4C and 4D are plots that schematically show timing signals in a depth mapping camera, in accordance with embodiments of the invention.

FIG. 4A is a plot that schematically shows timing signals in depth camera 20, in accordance with an embodiment of the invention. In this example, controller 26 has selected two different PRIs: PRI1=40 ns, and PRI2=44 ns. The controller drives emitters 54 to emit a sequences of pulses at PRI1, alternating with sequences of pulses at PRI2. PRI1 gives rise to a range limit 75 roughly 6 m from camera 20. In the embodiment shown in this figure, the times of flight of the pulses at PRI1 and PR2 are measured by time-to-digital converters (TDCs) with the same slope for both PRIs, meaning that the time resolution is the same at both PRIs.

In the pictured scenario, radiation source 22 transmits a pulse 70. An object at a small distance (for example, 2.4 m from camera 20) returns a reflected pulse 72, which reaches receiver 23 after a ToF of 16 ns. To measure the ToF, receiver 23 counts the time elapsed between transmitted pulse 70 and the receipt of reflected pulse 72. The count value for the pulse sequence at PRI1 is represented in FIG. 4A by a first sawtooth 76, while the value for the pulse sequence at PRI2 is represented by a second sawtooth 78. The two sawtooth waveforms are identical in shape, but with an offset in the intervals between the successive waveforms due to the difference in PRI. Therefore, for reflected pulse 72, the same ToF of 16 ns will be measured in both pulse sequences, at both PRI1 and PRI2. Each sawtooth in this embodiment is followed by a reset period for the purpose of TDC resynchronization.

On the other hand, an object at a distance larger than the range limit (for example, 8.4 m from camera 20) will return a reflected pulse 74, which reaches receiver 23 after a ToF of 56 ns. Pulse 74 thus reaches the receiver after radiation source 22 has already transmitted the next pulse in the sequence, and after the counters represented by sawtooth 76 and sawtooth 78 have been zeroed. Therefore, receiver 23 will record a ToF of 16 ns for pulse 74 during the sequence at PRI1. Because of the larger PRI during the sequence at PRI2, however, the receiver will record a ToF of 12 ns during this sequence.

Figure 4B:
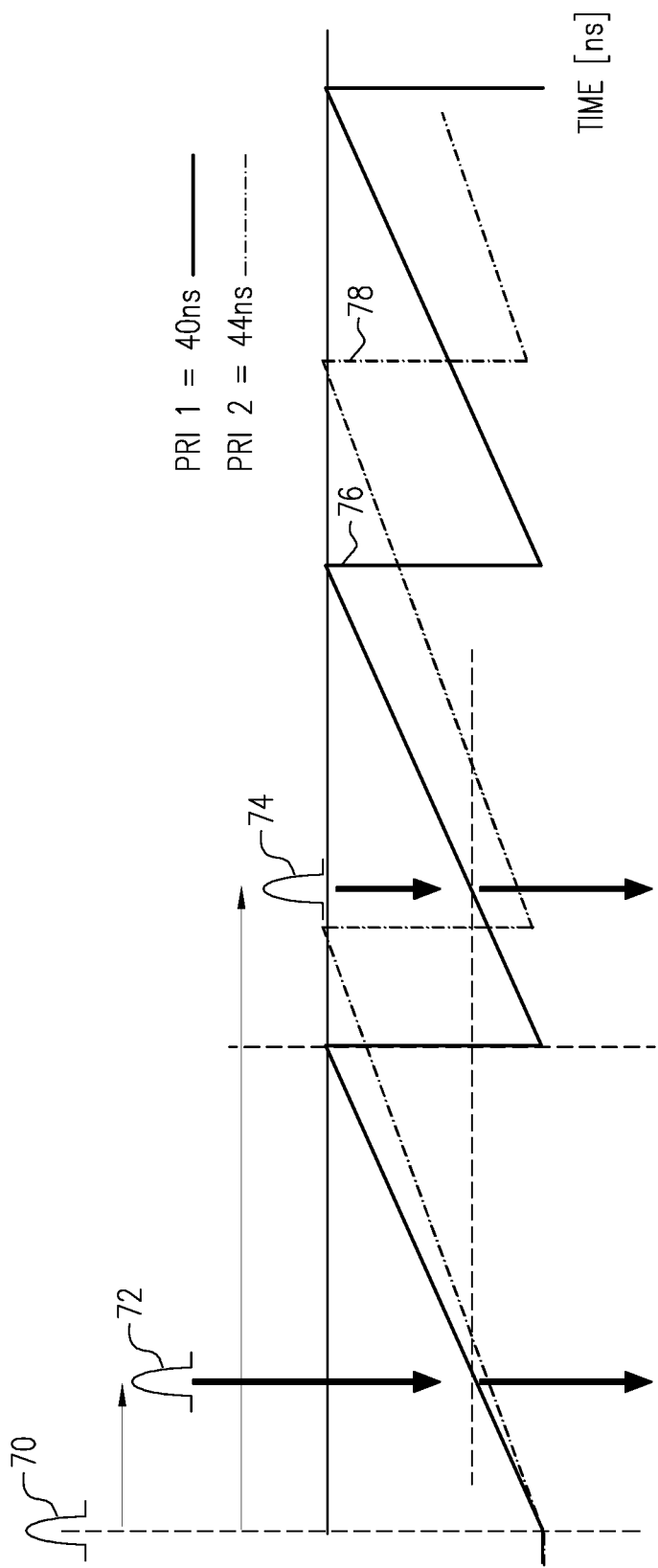
Figure 4C:
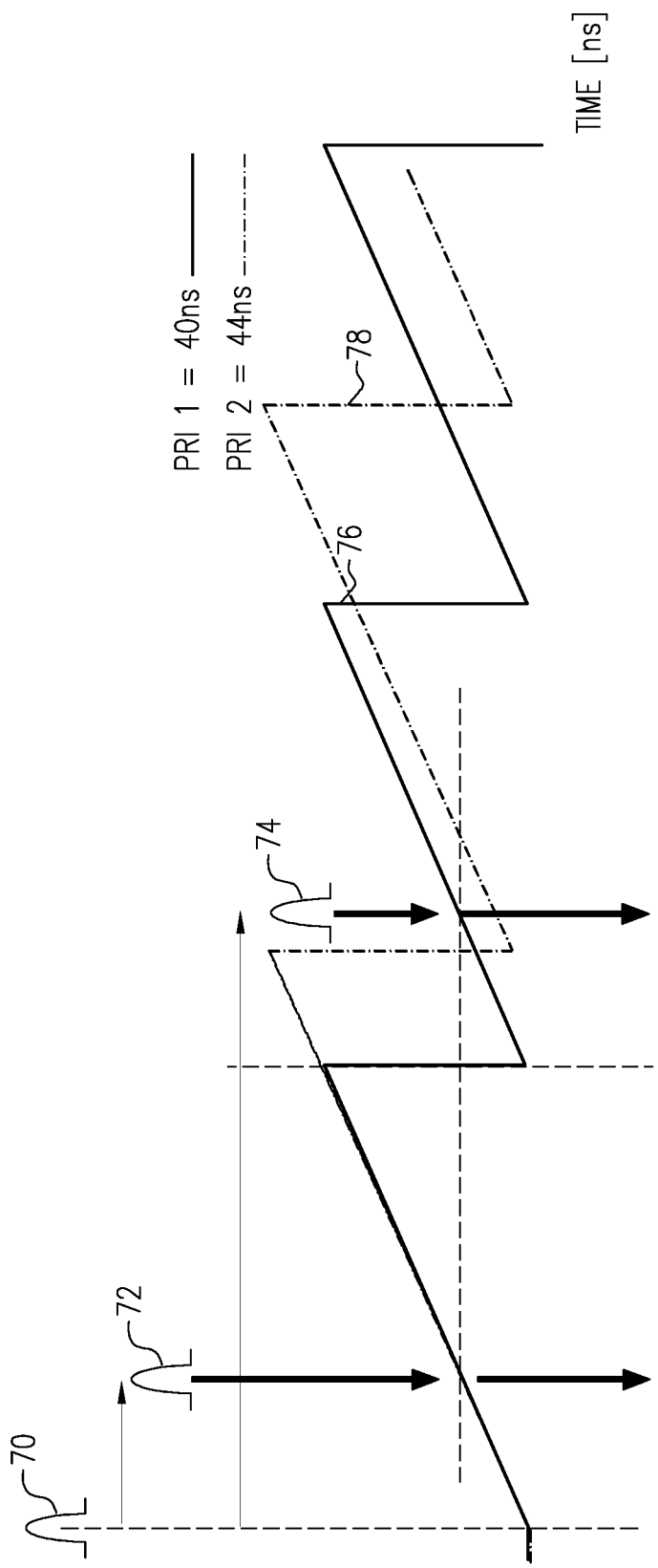

FIGS. 4B and 4C are plots that schematically show timing signals in depth camera 20, in accordance with other embodiments of the invention. These timing scheme are similar in operation to that described above with reference to FIG. 4A, but do not use a TDC reset period. In the embodiment of FIG. 4B, the TDCs use the same count resolution (same maximum number of counts) for both sawtooth 76 at PRI1 and the longer sawtooth 78 at PRI2. This approach is advantageous in reducing the number of memory bins that are used in histogram accumulation. In the embodiment of FIG. 4C, the TDCs detect photon arrival times with the same absolute temporal resolution at both PRI1 and PRI2, meaning that depth resolution can be enhanced, though at the expense of using a larger number of histogram bins.

Upon processing the ToF results in any of the above schemes, controller 26 will detect that that a certain point in scene 32 had two different ToF values during the pulse sequences at the two different PRI values. These two different ToF values are separated by the difference between the PRI values (4 ns). In this manner, controller 26 is able to detect that range folding has occurred at this point. Thus, the controller distinguishes the points in the scene whose respective depth coordinates are less than range limit 75 from the points in the scene whose respective depth coordinates are greater than the range limit, thereby resolving range folding of the depth coordinates. Depending on the difference between the PRI values (or equivalently, the beat frequency of the PRF values), controller 26 may be able to distinguish between different multiples of range limit 75 and thus extend the range of detection even farther.

Figure 4D:
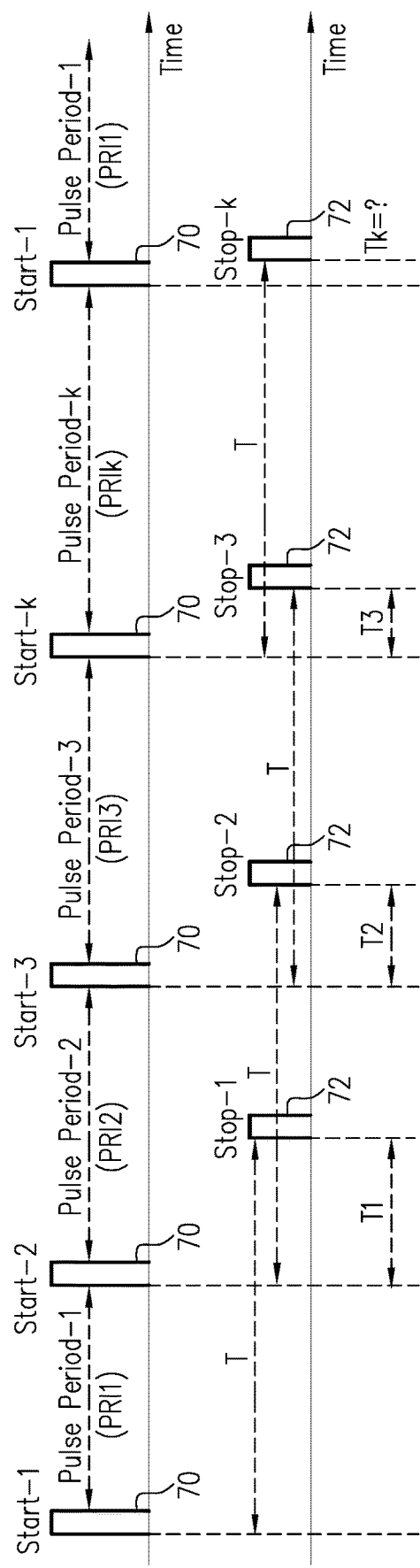

FIG. 4D is a plot that schematically shows timing signals in depth camera 20, in accordance with yet another embodiment of the invention. In this example, controller 26 selects three or more different PRIs: PRI1, PRI2, PRI3, . . . , PRIk. The controller drives radiation source 22 to transmit pulses 70 at the different PRIs sequentially in alternation. The object in this case is assumed to be at a distance D (corresponding to a time of flight T), which is beyond the range-folding limit, so that each reflected pulse 72 reaches receiver 23 after the next transmitted pulse 70 has already been transmitted. In other words, each reflected pulse j reaches the receiver at a time Tj after pulse j+1 has been transmitted. The actual distance to the object is given (in terms of time of flight) by the formula: T=T1+PRI1=T2+PRI2=T3+PRI3.

Receiver 23 may experience a "dead zone" immediately after each transmitted pulse 70, in which the receiver is unable to detect pulses reflected from target objects due to stray reflections within camera 20. This dead zone is exemplified by the last reflected pulse k in FIG. 4D, which reaches receiver 23 at a small time Tk following the next transmitted pulse. Controller 26 may consequently ignore signals output by the receiver within the dead zone. The use of three or more different PRIs, as in the present example, is advantageous in avoiding ambiguity due to dead zones of this sort and enhancing the accuracy of depth measurement. When three or more different PRIs are used, it is also possible to choose relatively shorter PRI values without risk of ambiguity due to range folding and dead zones, thus increasing the frequencies of the harmonics and reducing the probability of interference with radio transceivers 12 (FIG. 1).

It is advantageous to choose the PRI values that are used together in the sort of scheme that is shown in FIG. 4D such that each PRI (PRI1, PRI2, PRI3, . . . ) is co-prime with respect to the other PRIs (meaning that the greatest common integer divisor of any pair of the PRIs is 1). In this case, in accordance with the Chinese Remainder Theorem, the given set of measurements T1, T2, T3, . . . , will have exactly one unique solution T, as in the formula presented above, regardless of range folding.

Figure 5:
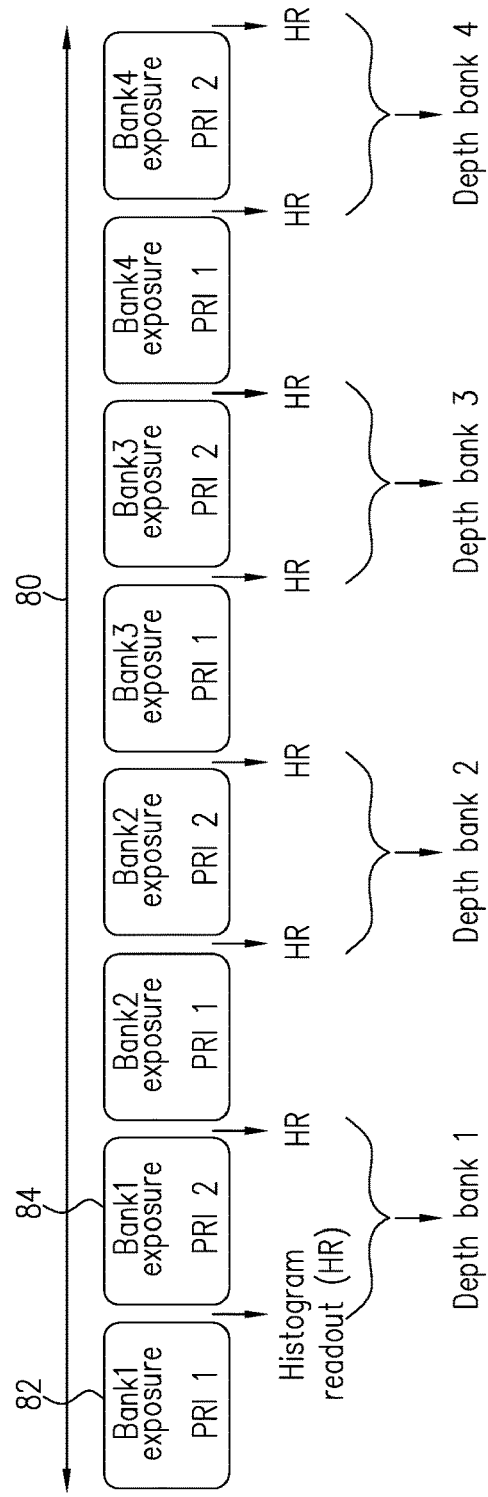
FIG. 5 is a block diagram that schematically illustrates the operation of a depth mapping camera using multiple banks of emitters, in accordance with an embodiment of the invention.

FIG. 5 is a block diagram that schematically illustrates the operation of camera 20 using multiple banks of emitters, in accordance with an embodiment of the invention, such as banks 62 of emitters 54 in FIG. 3. Controller 26 drives banks 62 sequentially so that each bank emits respective sequences of the pulses at the two different PRIs in succession. Alternatively, the principles of this embodiment may be extend to drive banks 62 to emit pulses at three or more different PRIs.

FIG. 5 shows the operation of camera 20 over a single frame 80 of depth map generation, for example a period of 33 ms. Frame 80 is divided into eight segments 82, 84, . . . , with two successive segments allocated to each of the four banks 62a, 62b, 62c and 62d. During the first segment 82, the first bank (for example, bank 62a) transmits a sequence of pulse at intervals given by PRI1, followed by a sequence of pulses at intervals given by PRI2 in segment 84. During each such segment, receiver 23 generates ToF histograms for the pixels (or super-pixels) in SPAD array 24 that have received pulses reflected from points in target scene 32. Thus, controller 26 will receive two ToF histograms in each frame 80 with respect to the points in scene 32 that are irradiated by bank 62a. Controller 26 can then compare the two histograms in order to disambiguate any range folding, as explained above, and thus converts the ToF histograms into precise depth coordinates.

This process of transmitting pulse sequences at PRI1 and PRI2 is repeated for each of the other banks 62b, 62c and 62d, and controller 26 thus receives the dual histograms and extracts depth coordinates for the corresponding sets of pixels in receiver 23. Controller 26 combines the depth coordinates generated over all four banks of emitters in order to create and output a complete depth map of scene 32.

Although FIG. 5 illustrates capture of a frame of data by collecting histograms separately at PRI1 and PRI2, in an alternative embodiment the ToF data can be collected in a concurrent or alternating fashion in the same histogram, which is read out only once for each bank (following block 84 in FIG. 5, for example). The histogram in this case will including peaks corresponding to both PRI values. The use of two histogram readouts, as in the embodiment of FIG. 5, provides more information in the sense that the histogram data can be unambiguously assigned to the particular PRI. Furthermore, because of shorter exposure times, the ToF data are less affected by ambient noise, thus improving range folding detectability. On the other hand, the additional readout required in this case, relative to the use of a single readout for both PRIs, consumes time and hence reduces the count of photons.

Figure 6:
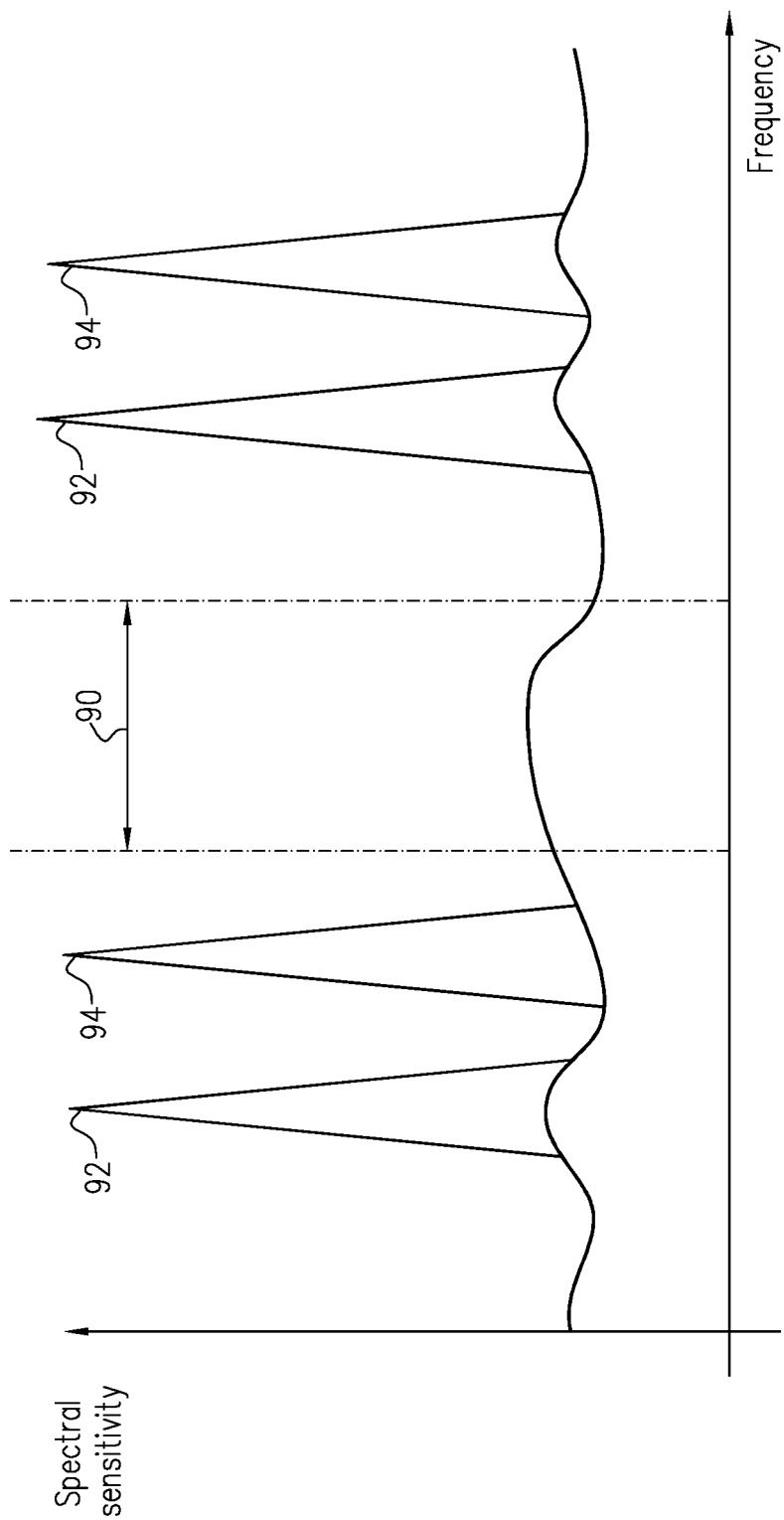
FIG. 6 is a plot that schematically illustrates harmonic frequencies of a pair of pulse repetition intervals, selected with reference to a cellular communication band, in accordance with an embodiment of the invention.

FIG. 6 is a plot that schematically illustrates harmonic frequencies 92, 94 of a pair of pulse repetition intervals, selected with reference to a cellular communication band 90, in accordance with an embodiment of the invention. In this example, frequency controller 14 has received the assignment of band 90 in the frequency spectrum, and has output to camera 20 a list of permitted PRI values, which will not generate any harmonics within band 90. Controller 26 selects the pulse rate intervals PRI1 and PRI2 from the list of permitted values. As a result, harmonic frequencies 92 and 94 fall entirely outside band 90, thus minimizing any possible interference with the performance of transceiver 12.

Figure 7:
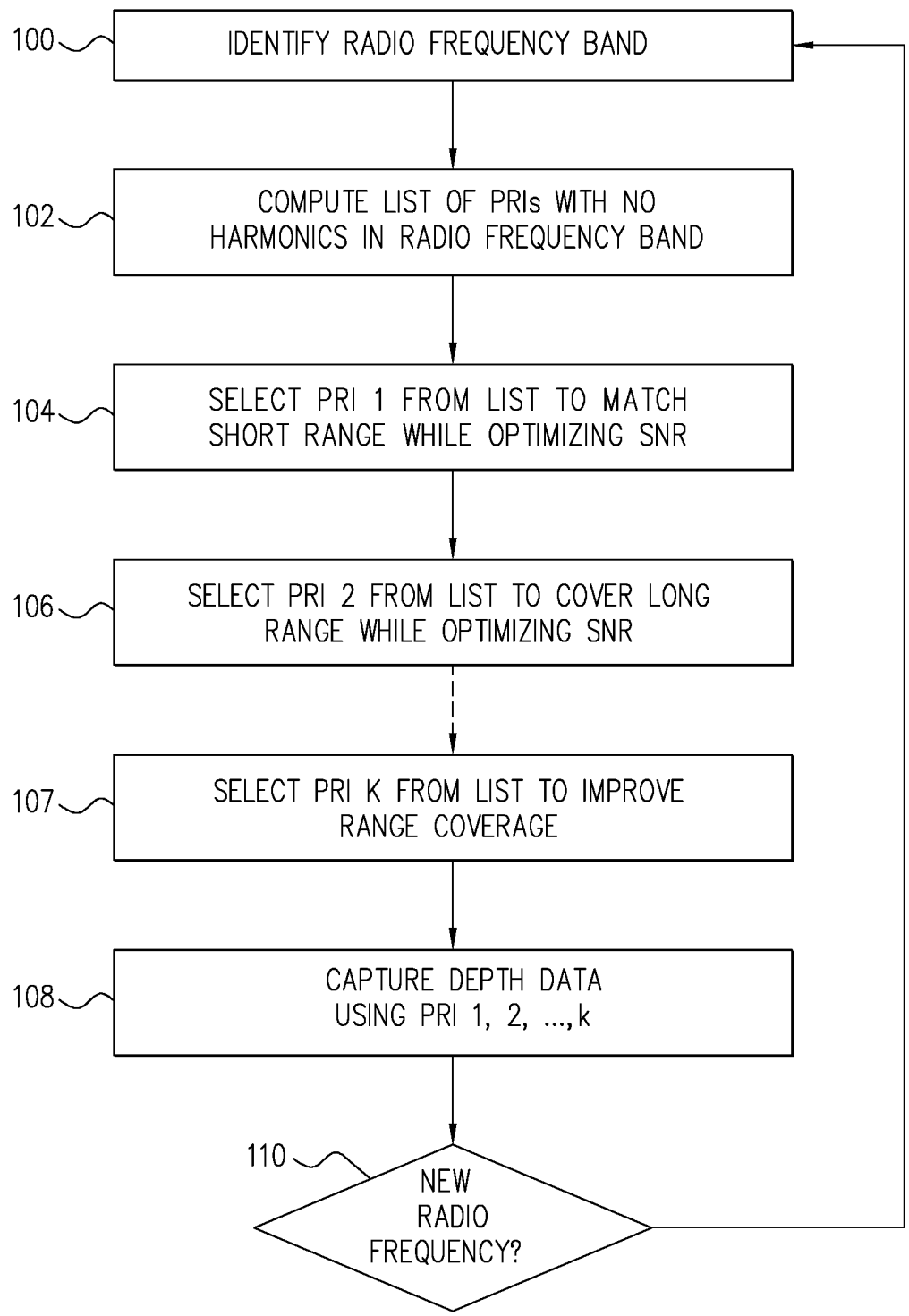
FIG. 7 is a flow chart that schematically illustrates a method for selecting pulse repetition intervals for use in depth mapping, in accordance with an embodiment of the invention.

FIG. 7 is a flow chart that schematically illustrates a method for selecting pulse repetition intervals for use in depth mapping, in accordance with an embodiment of the invention. The method is described, for the sake of clarity and concreteness, with reference to the components of device 10 (FIG. 1). The principles of this method, however, may similarly be applied in other devices that combine the functions of radio communication and pulsed range measurement.

Frequency controller 14 identifies the radio frequency band over which transceiver 12 is to communicate, at a frequency assignment step 100. Based on this assignment, the frequency controller computes a list of PRIs with no harmonics in the assigned radio frequency band, at a PRI list generation step 102. Alternatively, frequency controller 14 may compute and output available PRI values. Further alternatively, frequency controller 14 may convey the assignment of the radio frequency band to camera 20, and controller 26 may then compute the list of available PRIs.

Controller 26 of camera 20 selects a first PRI value (PRI1) from the list, at a first PRI selection step 104, and selects a second PRI value (PRI2) at a second PRI selection step 106. Optionally, controller 26 may choose one or more additional PRI values, up to PRIk, at a further PRI selection step 107. The controller may apply any suitable optimization criteria in choosing the PRI values. For example, controller 26 may select PRI1 and PRI2 so as to optimize SNR and maximize the range of the depth coordinates that can be measured by camera 20, while maintaining a resolution of the depth coordinates to be no greater (i.e., no worse) than a predefined resolution limit. Criteria that may be applied in this regard include:

Optimizing PRI difference to maximize detectability and measurability at long ranges, while setting a lower bound on the PRIs depending on the minimum range to be covered.

Optimizing compatibility with radio transceiver 12, including:

Guaranteeing no interference with transceiver 12.

Exploiting a-priori knowledge of cellular frequency channel changes (based on probabilities of channel use in certain environments, if possible).

Choosing PRIs that cover diverse wireless channels from a statistical point of view, in order to minimize potential reassignments of PRIs.

Using PRIs that avoid the need to switch internal synchronization circuits within device 10 whenever possible, in order to avoid acquisition delays and timing changes that may introduce transient depth errors.

Whenever internal synchronization frequencies needs to change, minimizing the step size in order to minimize transient depth errors.

The above criteria are presented only by way of example, and alternative optimization criteria may be used, depending on system design and operational environment. A systematic method for selecting groups of PRI values that can be used together advantageously is described hereinbelow with reference to FIG. 8.

Following the choice of PRI values, camera 20 captures depth data by emitting sequences of pulses at PRI1 and PRI2 in succession, as explained above, at a depth mapping step 108.

Camera 20 typically continues operating with the selected pair of PRI values, until frequency controller 14 assigns a new frequency band for communication by transceiver 12, at a new frequency assignment step 110. In this case, the method returns to step 100, where the frequency controller 14 modifies the permitted PRI range of camera 20. Controller 26 will then select new values of one or both of PRI1 and PRI2, so that the new values fall within the modified range. Operation of camera 20 continues using these new values.

Figure 8:
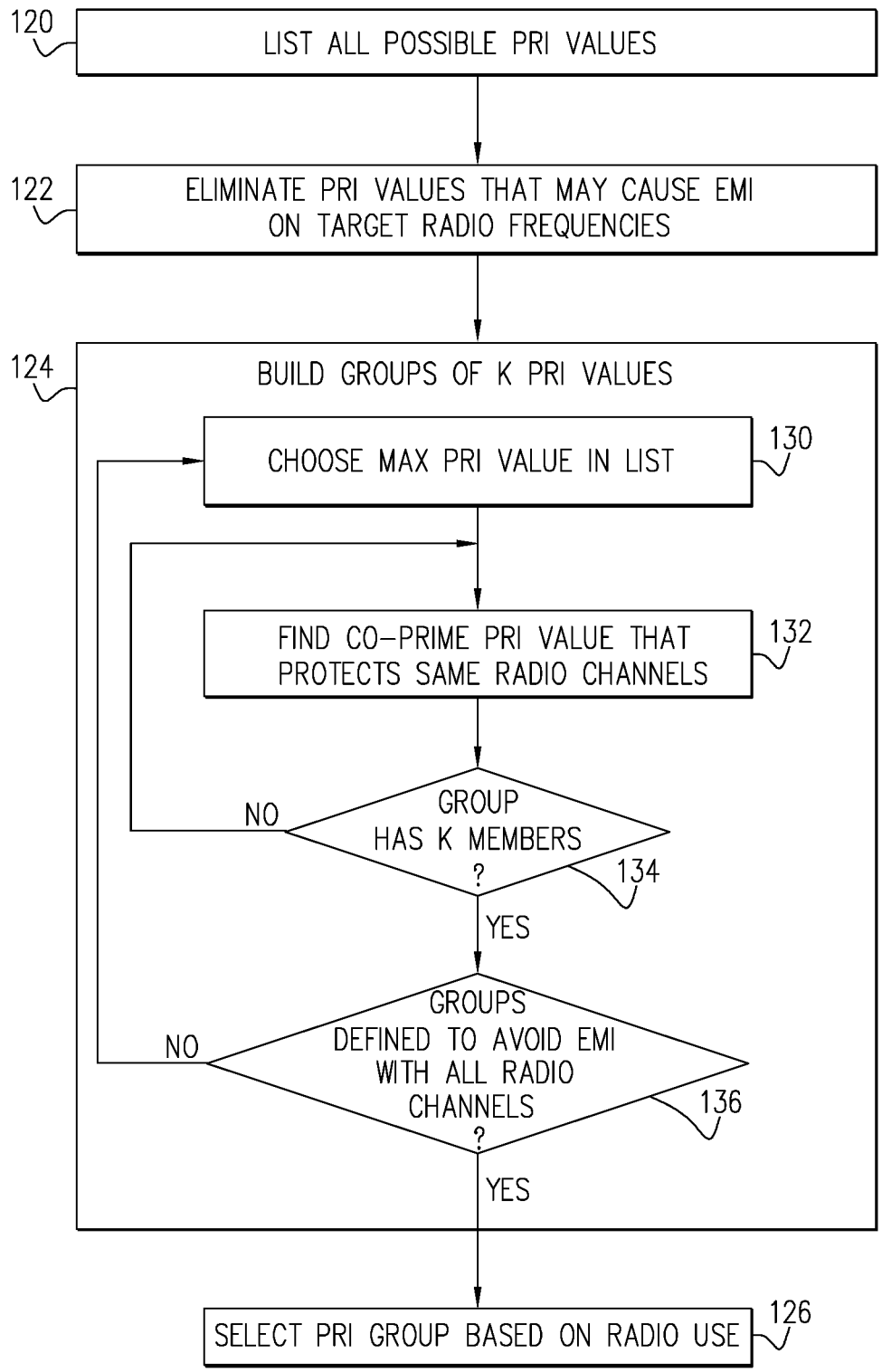
FIG. 8 is a flow chart that schematically illustrates a method for selecting pulse repetition intervals for use in depth mapping, in accordance with another embodiment of the invention.

FIG. 8 is a flow chart that schematically illustrates a method for selecting pulse repetition intervals for use in depth mapping, in accordance with another embodiment of the invention. As noted earlier, the principles of this specific method may be integrated into the more general methods that are described above.

Specifically, the method of FIG. 8 constructs groups of mutually-compatible PRI values and enables controller 26 to store a record of these groups. (The method may be carried out by controller 26 itself, but more typically, the record could be generated off-line by a general-purpose computer and then stored in a memory that can be accessed by the controller.) At any given time, controller 26 can then identify the operating environment of mobile communication device 10, such as the geographical region in which the device is operating, and can select the PRI group to apply in driving radiation source 21 based on the characteristics of the operating environment. For example, if controller 26 finds that certain frequency bands are commonly used for radio communication in a given environment, the controller may then select a group of PRIs so as to reduce the likelihood of interference with these frequency bands. The controller may derive this information, for example, by analyzing the operation of transceiver 12 or on the basis of information received from external sources.

In typical use, mobile communication device 10 comprises multiple transceivers, which operate concurrently in different frequency bands, such as the Global Position System (GPS) operating in the range of 1.5-1.7 GHz; wireless local area networks (Wi-Fi) operating on channels around 2.4 GHz and 5 GHz; and various cellular bands between 600 MHz and 5 GHz. In choosing the groups of PRI values, controller 26 can give priority to certain frequencies, so that PRIs with harmonics in high-priority radio bands are avoided. For example, because GPS signals are weak and require sensitive receivers, the GPS band will have high priority. Cellular channels that are used in critical signaling, as well as the lower ranges of cellular frequencies, which are more susceptible to interference, may be prioritized, as well. Wi-Fi channels may have lower priority, as long as for any given group of PRI values, there is at least one Wi-Fi channel that is free of interference.

In the method of FIG. 8, the computer begins by compiling a list of all possible PRI values that can be supported by camera 20, at a PRI compilation step 120. The computer then eliminates certain PRI values whose harmonics are liable to cause electromagnetic interference (EMI) on certain target radio frequencies, at a PRI elimination step 122. For example, the computer may eliminate:

PRI values with harmonics in the GPS band or bands.
PRI values with harmonics that will interfere with critical cellular channels and/or with high-priority cellular bands.
PRI values with harmonics that will interfere with entire bands of Wi-Fi channels.

Starting from the list of PRI values remaining after step 122, the computer builds groups of mutually-compatible PRI values, at a group building step 124. Each such group will include k members, wherein k≥2. Controller 26 stores a record of these groups. During operation of mobile communication device 10, controller will then select one of the groups of PRI values to use in camera 20, for example based on the operating environment and radio frequencies that are actually in use by transceiver 12, as explained above.

Various approaches may be adopted in building the groups of PRI values at step 124. In the present embodiment, for example, the computer begins by selecting the largest PRI value remaining in the list, at a starting PRI selection step 130. The computer then searches for another, smaller PRI value that is co-prime with the other values already selected for inclusion in this group, at a further PRI selection step 132. The computer starts by searching for PRI values that are close to the values already in the group, while ensuring that there is at least one Wi-Fi band with which none of the harmonics of any of the PRIs in the group will interfere. PRI values that do not satisfy this latter requirement are not selected in step 132. This process of adding and evaluating PRI values for incorporation in the present group continues iteratively until the group has k member PRI values, at a group completion step 134.

After a given group of k PRI values has been assembled, the computer returns to step 130 in order to construct the next group of PRI values. The process of building PRI groups continues until a sufficient number of groups has been constructed and stored, at a record completion step 136. For example, the computer may check the harmonics of the PRIs in each group to ensure that for each radio frequency band that may be used by transceiver 12, including cellular and Wi-Fi bands, there is at least one group of PRI values that will not interfere with the band. Controller 26 will then be able to choose the appropriate PRI group, at step 126, in order to accommodate the actual radio frequencies that are in use at any given time.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Sensing apparatus, comprising:
   a radiation source, which is configured to emit pulses of optical radiation toward multiple points in a target scene;
   a receiver, which is configured to receive the optical radiation that is reflected from the target scene and to output signals, responsively to the received optical radiation, that are indicative of respective times of flight of the pulses to and from the points in the target scene;
   a radio transceiver, which communicates over the air by receiving signals in an assigned frequency band; and
   processing and control circuitry, which is configured to select a first pulse repetition interval (PRI) and a second PRI, greater than the first PRI, from a permitted range of PRIs, wherein the processing and control circuitry is configured to identify the permitted range of the PRIs responsively to the assigned frequency band, and to drive the radiation source to emit a first sequence of the pulses at the first PRI and a second sequence of the pulses at a second PRI, and to process the signals output by the receiver in response to both the first and second sequences of the pulses in order to compute respective depth coordinates of the points in the target scene.

2. The apparatus according to claim 1, wherein the radiation source comprises an array of vertical-cavity surface-emitting lasers (VCSELs).

3. The apparatus according to claim 1, wherein the radiation source comprises an array of emitters, which are arranged in multiple banks, and wherein the processing and control circuitry is configured to drive the multiple banks sequentially so that each bank emits respective first and second sequences of the pulses at the first and second PRIs.

4. The apparatus according to claim 1, wherein the receiver comprises an array of single-photon avalanche diodes (SPADs).

5. The apparatus according to claim 1, wherein the first PRI defines a range limit, at which a time of flight of the pulses is equal to the first PRI, and wherein the processing and control circuitry is configured to compare the signals output by the receiver in response to the first and second sequences of pulses in order to distinguish the points in the scene for which the respective depth coordinates are less than the range limit from the points in the scene for which the respective depth coordinates are greater than the range limit, thereby resolving range folding of the depth coordinates.

6. The apparatus according to claim 5, wherein the processing and control circuitry is configured to compute, for each of the points in the scene, respective first and second histograms of the times of flight of the pulses in the first and second sequences, and to detect that range folding has occurred at a given point responsively to a difference between the first and second histograms.

7. The apparatus according to claim 1, wherein the permitted range is defined so that the PRIs in the permitted range have no harmonics within the assigned frequency band.

8. The apparatus according to claim 1, wherein the processing and control circuitry is configured to modify the permitted range in response to a change in the assigned frequency band of the radio transceiver, and select new values of one or both of the first PRI and the second PRI so that the new values fall within the modified range.

9. The apparatus according to claim 1, wherein the processing and control circuitry is configured to store a record of multiple groups of the PRIs, to identify an operating environment of the apparatus, and to select one of the groups to apply in driving the radiation source responsively to the identified operating environment.

10. The apparatus according to claim 9, wherein the processing and control circuitry is configured to select the one of the groups responsively to a geographical region in which the apparatus is operating.

11. The apparatus according to claim 9, wherein the groups of the PRIs have respective priorities that are assigned responsively to a likelihood of interference with frequencies used by the radio transceiver, and wherein the processing and control circuitry is configured to select the one of the groups responsively to the respective priorities.

12. The apparatus according to claim 9, wherein the PRIs in each group are co-prime with respect to the other PRIs in the group.

13. The apparatus according to claim 1, wherein the processing and control circuitry is configured to select a third PRI, greater than the second PRI, from the permitted range of the PRIs, and to drive the radiation source to emit a third sequence of the pulses at the third PRI, and to process the signals output by the receiver in response to the first, second and third sequences of the pulses in order to compute the respective depth coordinates of the points in the target scene.

14. The apparatus according to claim 1, wherein the processing and control circuitry is configured to select the first and second PRIs so as to maximize a range of the depth coordinates while maintaining a resolution of the depth coordinates to be no greater than a predefined resolution limit.

15. A method for sensing, comprising:
selecting a first pulse repetition interval (PRI) and a second PRI, greater than the first PRI, from a permitted range of PRIs;
driving a radiation source to emit a first sequence of pulses of optical radiation at the first PRI and a second sequence of the pulses of the optical radiation at the second PRI toward each of multiple points in a target scene;
receiving the optical radiation that is reflected from the target scene and outputting signals, responsively to the received optical radiation, that are indicative of respective times of flight of the pulses to and from the points in the target scene; and
processing the signals output in response to both the first and second sequences of the pulses in order to compute respective depth coordinates of the points in the target scene,
wherein selecting the first PRI and the second PRI comprises identifying a permitted range of the PRIs responsively to an assigned frequency band of a radio transceiver, which communicates over the air in the assigned frequency band in proximity to the radiation source, and choosing the first PRI and the second PRI from the permitted range.

16. The method according to claim 15, wherein the first PRI defines a range limit, at which a time of flight of the pulses is equal to the first PRI, and wherein processing the signals comprises comparing the signals output in response to the first and second sequences of pulses in order to distinguish the points in the scene for which the respective depth coordinates are less than the range limit from the points in the scene for which the respective depth coordinates are greater than the range limit, thereby resolving range folding of the depth coordinates.

17. The method according to claim 15, wherein the permitted range is defined so that the PRIs in the permitted range have no harmonics within the assigned frequency band.

18. The method according to claim 15, and comprising selecting a third PRI, greater than the second PRI, from the permitted range of the PRIs, wherein driving the radiation source comprises directing a third sequence of the pulses at the third PRI toward the target scene, and wherein processing the signals comprises using the signals that are output in response to the first, second and third sequences of the pulses in order to compute the respective depth coordinates of the points in the target scene.

* * * * *